United States Patent [19]

Nakagawa et al.

[11] Patent Number: 5,699,835
[45] Date of Patent: Dec. 23, 1997

[54] MULTI-LAYER PLASTIC HOLLOW PIPE

[75] Inventors: Tatsuya Nakagawa, Matsudo; Yasuo Ezaki, Nitta-machi, both of Japan

[73] Assignee: Excell Corporation, Japan

[21] Appl. No.: 749,713

[22] Filed: Nov. 15, 1996

Related U.S. Application Data

[63] Continuation of Ser. No. 205,681, Mar. 2, 1994, abandoned, which is a continuation of Ser. No. 800,330, Nov. 26, 1991, abandoned.

[30] Foreign Application Priority Data

Nov. 26, 1990 [JP] Japan .................................. 2-317985

[51] Int. Cl.$^6$ ...................................................... F16L 9/14
[52] U.S. Cl. ........................... 138/141; 138/153; 138/174; 138/177
[58] Field of Search ........................ 138/103, 109, 138/137, 140, 141, 142, 143, 153, 172, 174, 132, 134, 121, 122, 177, 178; 285/423, 919, 405, 412, 414

[56] References Cited

U.S. PATENT DOCUMENTS

| | | | |
|---|---|---|---|
| 489,478 | 1/1893 | Hopkinson | 138/132 |
| 1,767,421 | 6/1930 | Wirth | 138/147 |
| 1,884,741 | 10/1932 | Kleffel | 138/147 |
| 2,394,270 | 2/1946 | Swain | 138/137 |
| 2,640,501 | 6/1953 | Scott et al. | 138/132 |
| 2,962,051 | 11/1960 | Burkes | 138/177 |
| 3,047,026 | 7/1962 | Kahn | 138/121 |
| 3,109,461 | 11/1963 | Wolf et al. | 138/137 |
| 3,363,918 | 1/1968 | Fisher | 285/423 |
| 3,548,884 | 12/1970 | Ambrose | 138/137 |
| 3,734,139 | 5/1973 | Zafiroglu | 138/141 |
| 3,796,449 | 3/1974 | McLaughlin et al. | 285/423 |
| 3,825,036 | 7/1974 | Stent | 138/174 |
| 3,858,616 | 1/1975 | Thiery et al. | 138/133 |
| 3,871,408 | 3/1975 | Wood et al. | 138/137 |
| 3,874,544 | 4/1975 | Harmon | 138/147 |
| 3,890,181 | 6/1975 | Stent et al. | 138/137 |
| 3,891,007 | 6/1975 | Kleykamp | 138/137 |
| 3,902,531 | 9/1975 | Thawley | 138/137 |
| 4,157,101 | 6/1979 | Ross | 138/132 |
| 4,157,194 | 6/1979 | Takahashi | 138/109 |
| 4,290,456 | 9/1981 | Ahrbeck | 138/109 |
| 4,343,672 | 8/1982 | Kanao | 138/132 |
| 4,407,528 | 10/1983 | Anthony | 138/109 |
| 4,560,607 | 12/1985 | Sumner | 138/137 |
| 4,706,712 | 11/1987 | Oglesby et al. | 138/137 |
| 5,148,836 | 9/1992 | Lawrence | 138/109 |

FOREIGN PATENT DOCUMENTS 1 107 132  3/1968  United Kingdom .

Primary Examiner—David Scherbel
Assistant Examiner—James F. Hook
Attorney, Agent, or Firm—Skjerven Morrill Macpherson Franlin & Friel; Thomas S. MacDonald

[57] ABSTRACT

A multi-layered plastic pipe particularly suitable for use as an intake manifold of an internal combustion engine is provided. The present pipe includes a hollow plastic core, at least one spacer member provided on the hollow plastic core and an outer layer integrally provided on the outer peripheral surface of the hollow plastic core excepting the spacer member. The spacer member is preferably formed from a plastic material, and the outer layer is also formed from a plastic material. There is also provided a method for manufacturing a multi-layered plastic pipe using a spacer member to prevent a hollow plastic core placed in a mold cavity from being deformed when a molted plastic material is supplied into the mold cavity under pressure.

14 Claims, 15 Drawing Sheets

Fig.11d
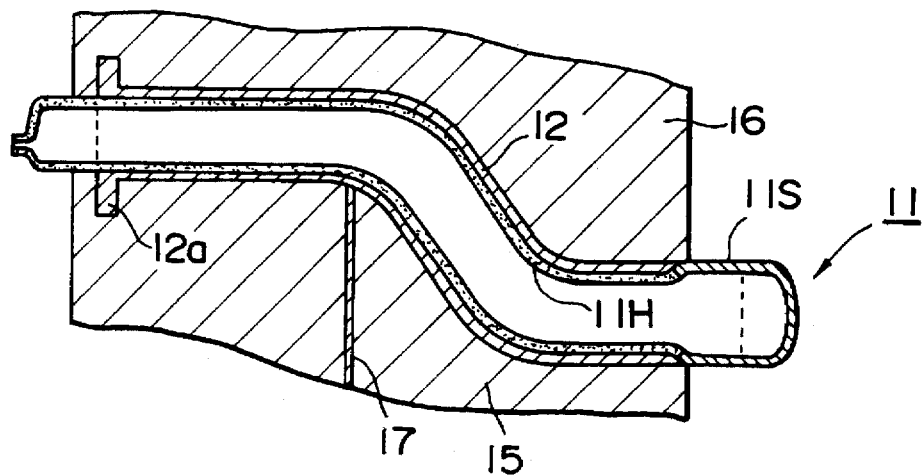
Fig.11e
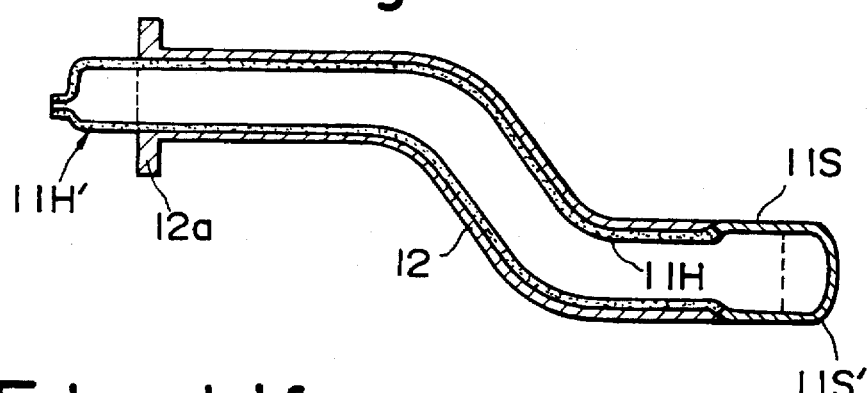
Fig.11f
Fig.11g
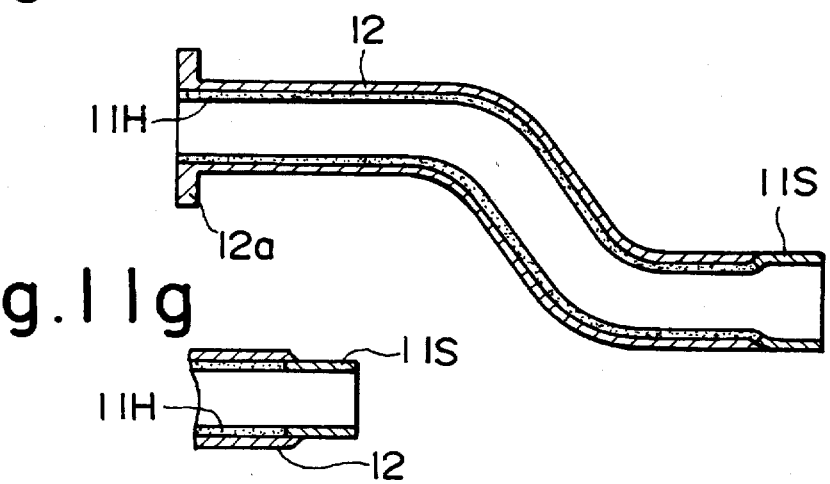

MULTI-LAYER PLASTIC HOLLOW PIPE

This application is a continuation of application Ser. No. 08/205,681, filed Mar. 2, 1994 which was a continuation of application Ser. No. 07/800,330, filed Nov. 26, 1991 all abandoned.

BACKGROUND OF THE INVENTION

1. Field of the Invention

This invention generally relates to a multi-layer plastic pipe and a method for manufacturing the same, and, in particular, to such a plastic pipe as a duct for use as an automobile component like an intake manifold.

2. Description of the Prior Art

Since the advent of a method for manufacturing a plastic pipe whose center axis varies two-dimensionally or three-dimensionally in an arbitrary manner by blow molding, many of the pipes or ducts used in automobiles have been and still are being replaced with plastic pipes and ducts. By providing such plastic pipes having a two-dimensional or three-dimensional arbitrary shape, for example, when ducts or pipes are to be disposed in a limited space of an automobile, such as an engine room, without the necessity to assemble a plurality of pipe components having simpler shapes, a plastic pipe of a unitary structure having a complicatedly bent shape, either two-dimensionally or three-dimensionally, can be provided, which contributes to facilitate an mounting operation of ducts or pipes. In addition, with such a plastic pipe of a unitary structure, since there is no connection between pipe components, there is no possibility of occurrence of leaks of a fluid passing through the ducts or pipes. For this reason, many of the conventional ducts or pipes made of rubber or the like for use in an engine room of an automobile have been and are being replaced by plastic pipes.

However, for example, even for duct and pipes for use in an engine room of an automobile, the required conditions may vary radically depending on the conditions in which they are used. In particular, since such a duct or pipe as an intake manifold is directly mounted on an engine, it is exposed to a significantly high temperature, and, moreover, since a vibration is directly applied thereto, a high degree of durability is required. For such a reason, the conventional intake manifold of an automobile was normally fabricated from a metal, such as aluminum. However, when a duct or pipe is to be manufactured from a metal, its manufacturing operation is complicated, difficult and expensive, and, moreover, the shape of a duct or pipe to be manufactured tends to be limited.

Therefore, a considerable effort and a sizable amount of money have been expended to try to replace such a duct or pipe as an intake manifold with a plastic duct or pipe; however, since it is a kind of duct or pipe which requires a high degree of heat-resistant characteristic as well as an increased durability, there has not yet been proposed any such plastic pipe or duct which can be put to practical use and its manufacturing method.

SUMMARY OF THE INVENTION

In accordance with the present invention, there is provided a multi-layered plastic pipe having a structure which allows to provide a plastic pipe having a high degree of durability and heat-resistant characteristic and its manufacturing method. It is to be noted that here the terms "pipe" and "duct" are used exchangeably without changing their meanings.

In accordance with one aspect of the present invention, a multi-layered plastic pipe includes a hollow member formed in a desired shape from a first plastic material. At least one spacer member or projection formed from a second plastic material is provided at a predetermined location on an outer surface of the hollow member. In addition, an outer layer of a third plastic material is formed on the outer surface of the hollow member integrally with the spacer member.

In a preferred embodiment, the hollow member is manufactured to a desired shape by blow molding, and the spacer member is integrally formed with the hollow member when blow molded. Moreover, preferably, the outer layer includes at least one integrally formed flange portion at an end of the plastic pipe.

In accordance with another aspect of the present invention, a method for manufacturing a multi-layered plastic pipe by integrally forming an outer layer of a third plastic material on the outer peripheral surface of a hollow core which has been molded to a desired shape from a first plastic material. In accordance with a preferred method of the present invention, when the hollow core is placed in a mold cavity, at least one spacer member is interposed between the outer surface of the hollow core and the surface of the mold cavity to thereby define a predetermined gap therebetween. Then, the third plastic material in a molten state is injected into the cavity or the gap between the outer surface of the hollow core and the mold surface and the third plastic material thus injected is hardened, for example, by cooling, thereby forming an outer layer integrally on the outer surface of the hollow core, together with the spacer member. Preferably, the hollow core is fabricated by blow molding, together with the spacer member integrally. In this manner, since the spacer member is present between the hollow core and the cavity surface when the hollow core is placed in position in the mold cavity, a predetermined gap can be maintained between the hollow core and the cavity surface while the molten third plastic material is injected into the cavity. As a result, there can be formed an outer layer having a desired thickness and a desired shape across the entire surface of the hollow core.

In accordance with a further aspect of the present invention, there is provided another method for manufacturing a multi-layered plastic pipe. In accordance with this method, a plurality of mold segments are put together to define a mold cavity with a hollow plastic core placed inside the mold cavity. In this case, the mold segments are not completely put together, but a predetermined clearance is maintained between at least two of the mold segments such that the clearance may allow air to pass therethrough, but it does not allow any molten plastic material to pass therethrough. Under the condition, a plastic material in a molten state is supplied under pressure into the cavity, and, then, the mold segments are put together completely to thereby apply a pressure to the plastic material thus supplied into the cavity, so that an outer layer having a desired shape is integrally formed from a third plastic material on the outer peripheral surface of the hollow core in a unitary structure.

Preferably, in order to prevent the hollow core from being undesirably deformed during manufacture, the hollow plastic core may be filled with particles, such as sand, or a pressurized gas may be supplied into the interior of the hollow core at least while an external pressure is applied to the outer surface of the hollow core.

It is therefore a primary object of the present invention to provide an improved plastic pipe and a method for manufacturing the same.

Another object of the present invention is to provide a multi-layered plastic pipe having an increased durability and an enhanced heat-resistant characteristic and its manufacturing method.

A further object of the present invention is to provide an improved plastic pipe which can be used as an intake manifold and its manufacturing method.

A still further object of the present invention is to provide an improved plastic pipe simple in structure and thus easy to manufacture and low at cost.

Other objects, advantages and novel features of the present invention will become apparent from the following detailed description of the invention when considered in conjunction with the accompanying drawings.

BRIEF DESCRIPTION OF THE DRAWINGS

FIGS. 11a through 11g are schematic illustrations showing a sequence of steps in manufacturing a multi-layered plastic pipe having both of soft and hard portions in accordance with another embodiment of the present invention;

DESCRIPTION OF THE PREFERRED EMBODIMENTS

Figure 1:
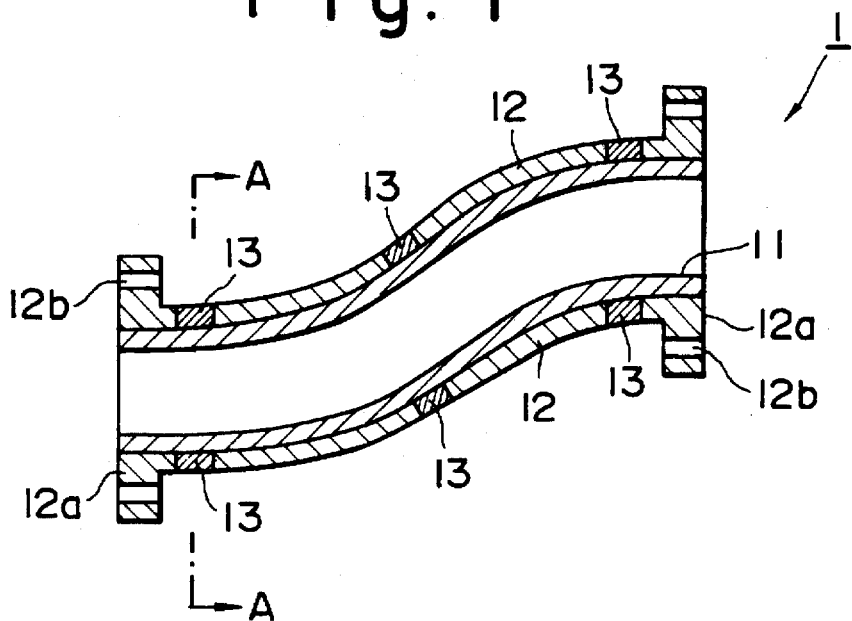
FIG. 1 is a schematic illustration showing a multi-layered plastic pipe constructed in accordance with one embodiment of the present invention.
Figure 2:
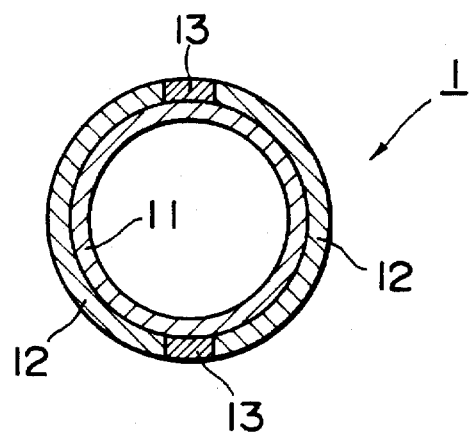
FIG. 2 is a schematic illustration showing a cross section of the plastic pipe taken along line 2—2 indicated in FIG. 1.
Figure 3:
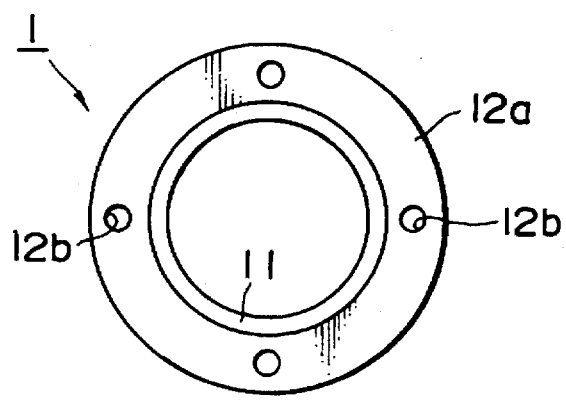
FIG. 3 is a schematic illustrating showing an end view of the plastic pipe of FIG. 1.

Referring now to FIGS. 1 through 3, there is schematically shown a multi-layered plastic pipe 1 constructed in accordance with one embodiment of the present invention, and this pipe 1 is particularly suited for use as an intake manifold of an automobile, for example. The multi-layered plastic pipe 1 includes a hollow member 11 which has been formed from a first plastic material into a desired shape, and a spacer member or projection 13 formed from a second plastic material to a predetermined height or thickness is provided at a predetermined location (at six places in the illustrated example) on the outer peripheral surface of the hollow member 11. As seen from the cross-sectional views in FIGS. 1 and 2, the projections are in the form of columns extending outwardly from the exterior surface of hollow member 11. And, an outer layer 12 is formed in a predetermined shape on the outer peripheral surface of the hollow member 11 excepting where the spacer members 13 are provided. In the illustrated embodiment, the outer layer 12 is integrally formed with the hollow member 11 and the spacer members 13, and the outer layer 12 has a thickness substantially equal to the thickness or height of each of the spacer members 13. For example, the outer layer 12 may be integrally formed with the hollow member 11 and the spacer members 13 by adhesion or melting. The outer layer 12 defines a flange portion 12a at each end of the multi-layered plastic pipe 1, and each flange portion 12a is formed with a plurality of mounting holes 12b.

In a preferred embodiment, the hollow member 11 is formed by blow molding and it has a desired shape with its center axis bent two-dimensionally or three-dimensionally. The spacer members 13 may be integrally formed at the same time when the hollow member 11 is formed by blow molding, or, alternatively, after forming the hollow member 11 by blow molding, the spacer members 13, which have been made separately, may be integrally provided at predetermined locations on the outer peripheral surface of the hollow member 11, for example, by using an adhesive or melting them together locally. The spacer members 13 may be made from a plastic material which is the same as or different from that of the hollow member 11. Thus, the spacer members 13 may provide a locally different characteristic at a location where the multi-layered plastic pipe 1 is locally brought into contact with another member or where another member is to be mounted thereon.

The outer layer 12 is integrally formed with the hollow member 11, but the outer layer 12 may be formed from a plastic material different from the plastic material of the hollow member 11. As a result, the multi-layered plastic pipe 1 can be given a desired characteristic depending on the condition in which it is used. For example, since the hollow member 11 defines a flow passage for guiding the flow of a fluid, it can be formed from a plastic material having a desired characteristic required in connection with the flow of such fluid. For example, when the multi-layered plastic pipe 1 is to be used as an intake manifold of an engine, use is preferably made of a plastic material having an excellent anti-gasoline characteristic and anti-blow-by gas characteristic; whereas, when the multi-layered plastic pipe 1 is to be used as a radiator hose of an automobile, use is preferably made of a plastic material having an excellent anti-LLC (Long Life Coolant) characteristic.

The outer layer 12 has a specific object to provide a mechanical strength and/or anti-heat resistant characteristic to the multi-layered plastic pipe 1. Thus, although the outer layer 12 can be fabricated basically from the same plastic material as that of the hollow member 11, it is preferable to use such a plastic material which also includes reinforcing materials, such as fibers or fillers. Such reinforcing materials typically include glass fibers, carbon fibers, talc and mica. Different plastic materials may be used for the hollow member 11, spacer members 13 and outer layer 12 as long as they are soluble to each other. In the case where such a solubility does not exist by themselves, use may be made of an adhesive layer between the two plastic materials having no solubility therebetween. All of the hollow member 11, spacer members 13 and outer layer 12 may be made from the same plastic material, if desired. The preferred plastic materials to be used for the hollow member 11 and spacer members 13 include nylon 6, nylon 6-6, nylon 6 or 6-6 (containing 20% of glass fibers), nylon 11 or 12, nylon 4-6 or 6-10 or 6-12, nylon family alloys, PPS (polyphenylene sulfide), PET (polyethylene terephthalate), PBT (polybutylene terephthalate), PES (polyether sulfone), PEEK (polyetheretherketone), polyimide and polyamideimide. On the other hand, the preferred plastic materials for forming the outer layer 12 include a mixture of each of the plastic materials listed above for forming the hollow member 11 with a desired percentage, such as 30%, of reinforcing materials, such as glass fibers.

As shown in FIGS. 1 and 3, since the outer layer 12 is formed from a plastic material having an excellent mechanical strength, a flange portion 12a can be formed as a portion thereof. The flange portion 12a is formed with a plurality of mounting holes 12b, so that the flange portion 12a can be directly mounted, for example, on a port of an engine or a radiator of an automobile using bolts and nuts. In the embodiment shown in FIGS. 1 and 2, the spacer members 13 are disposed on opposite sides of the hollow member 11; however, such a spacer member 13 may be provided at least one location of the outer peripheral surface of the outer member 11, so that the present invention should not be limited to such a specific arrangement of spacer members 13 as shown in FIGS. 1 and 2. As will be described in detail later, the location and number of such spacer members 13 may be determined in accordance with the conditions in which the multi-layered plastic pipe 1 is used and with its manufacturing method used.

Next, referring to FIGS. 4a through 4c, a process for manufacturing the multi-layered plastic pipe 1 according to one embodiment of the present invention will be described in detail below.

Figure 4A:
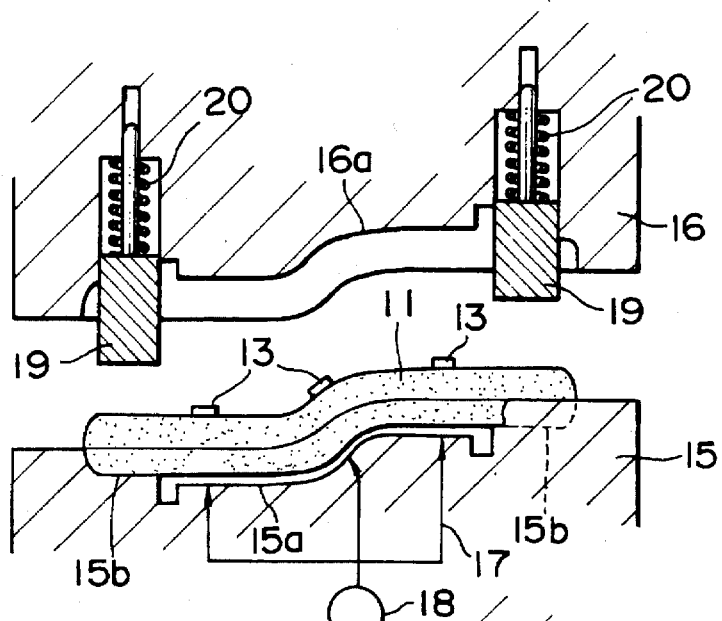
FIGS. 4a through 4c are schematic illustrations showing a sequence of steps for manufacturing a multi-layered plastic pipe in accordance with one embodiment of the present invention.

As shown in FIG. 4a, in accordance with this embodiment, use is made of a pair of first mold half 15 and a second mold half 16, which together define a complete mold when placed in contact together, and these first and second mold halves 15 and 16 are provided to be movable closer to each other or separated away from each other. In the illustrated embodiment, the first mold half 15 is provided fixed in position with its mating surface facing upwards, whereas, the second mold half 16 is provided to be movable vertically so that it can move closer toward or separated away from the associated, stationary first mold half 15. The mating surface of the first mold half 15 is formed with a first mold groove 15a which has a predetermined shape and defines a first half of a mold cavity. A seat section 15b is formed at each end of the first mold groove 15a, and these seat sections 15b serve to hole a hollow plastic core 11 in position when it is placed in the first mold half 15a. The first mold half 15 is also provided with a predetermined number of supply passages 17 which are in communication with a supply source 18 for supplying a plastic material. Thus, the third plastic material in a molten state is supplied from the supply source 18 into the cavity defined by the first and second mold halves 15 and 16 when brought into a semi-mating condition through these supply passages 17.

The second mold half 16 also has a mating surface which is brought into contact with the mating surface of the first mold half 15, and the mating surface of the second mold half 16 is also formed with a second mold groove 16a having a desired shape. As shown, a sliding core 19 is provided at each end of the second mold groove 16a and it is provided to be slidingly movable in a guide hole formed in the second mold half 16. A spring is provided in the guide hole so that the sliding core is normally pressed outward to be located at its advanced location. The sliding core 19 has its front surface shaped to be commensurate with and thus to partly receive therein the hollow plastic core 11 and the front surface of the sliding core 19 may be brought into contact with the mating surface of the first mold half 15.

Now, a process for manufacturing a multi-layered plastic pipe using a pair of first and second mold halves 15 and 16 as described above will be described. In the first place, the hollow plastic core 11 is formed into a desired shape from a first plastic material, for example, by a blow molding technique. The tip end portion at each end of the hollow plastic core 11 will be eventually removed; however, using these tip end portions, the hollow plastic core 11 is located in position in the first mold groove 15a by having its tip end portions placed on the seat sections 15b of the first mold half 15 as shown in FIG. 4a. As shown, the hollow plastic core 11 is provided with a plurality of spacer members 13 at selected locations on its outer peripheral surface. Preferably, these spacer members 13 are formed at the same time when the hollow plastic core 11 is fabricated. In the present embodiment, since it is so structured that a third plastic material in a molten state is supplied into the cavity through supply passages 17 provided in the first mold half 15, the spacer members 13 are provided only at the upper half of the outer peripheral surface of the horizontally extending hollow plastic core 11. However, if desired, these spacer members 13 may also be provided at other locations of the outer peripheral surface of the hollow plastic core 11 additionally. It is to be noted, however, that these spacer members 13 should be provided at such locations of the hollow plastic core 11 which can counteract the force applied to the hollow plastic core 11 when the plastic material in a molten state is supplied into the cavity. As a result, in the present embodiment, these spacer members 13 should be provided at least at an upper half of the outer peripheral surface of the hollow plastic core 11 which extends horizontally.

Figure 4B:
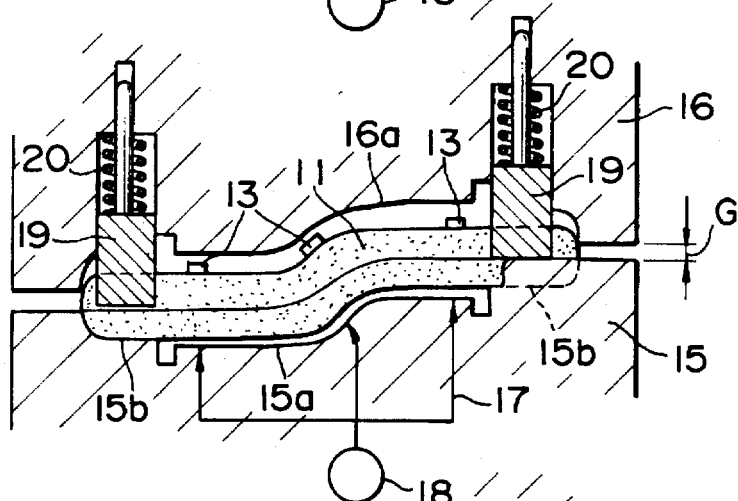

Then, as shown in FIG. 4b, the second mold half 16 is lowered, during which, the sliding cores 19 are first brought in contact with the respective end portions of the hollow plastic core 11 and with the mating surface of the first mold half 15. At this time, the hollow plastic core 11 is set in position in the cavity defined between the first and second mold halves 15 and 16. When the second mold half 16 is further lowered, the sliding cores 19 are retracted into the respective guide holes of the second mold half 16 against the force of the springs 20 since the sliding cores 19 are in contact with the mating surface of the first mold half 15. When a clearance G between the two mating surfaces of the first and second mold halves 15 and 16 has reached a predetermined value (semi-mating condition), the second mold half 16 stops its descending motion. The value of clearance G in this case may be set at any desired value depending on the circumstances; however, it is typically set in a range between 2 and 5 mm. Under the condition, the third plastic material in a molten state is supplied from the supply source 18 into the cavity through the supply passages 17. In this case, in the present embodiment, since the spacer members 13 are provided on the hollow plastic core 11 on its outer peripheral surface at such locations opposite to the direction of supply of the third plastic material into the cavity, the hollow plastic core 11 is maintained in position with its spacer members 13 in contact with the surface of the second mold groove 16a, so that the third plastic material thus supplied is prevented from being biased in distribution inside the cavity.

Figure 4C:
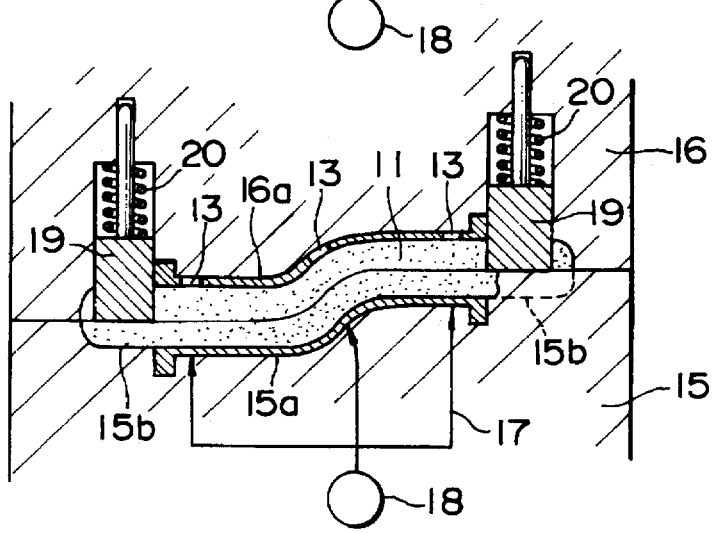

Then, after supplying the third plastic material sufficiently into the cavity, the supply of the third plastic material is terminated, and, as shown in FIG. 4c, the second mold half 16 is again caused to descend until the first and second mold halves 15 and 16 are brought into a complete mating condition in which the mating surface of the first mold half 15 in contact with the mating surface of the second mold half 16. As a result, the third plastic material supplied into the cavity or the gap between the hollow plastic core 11 and the surface of each of the first and second mold grooves 15a and 16a is uniformly distributed across the entire cavity, thereby forming the outer layer 12 having a desired shape from the third plastic material and integral with the hollow plastic core 11. During this compression step, the third plastic material supplied into the cavity will be sufficiently supplied to a large volume section, such as a flange section. In addition, due to the provision of spacer members 13 at selected locations on the hollow plastic core 11, the hollow plastic core 11 is prevented from deforming and the outer layer 12 having a desired shape and thickness can be integrally fabricated around the hollow plastic core 11, together with the spacer members 13.

In the case where the strength of the hollow plastic core 11 itself is not sufficient and thus there is a possibility that the hollow plastic core 11 may be deformed during the above-described compression step, the internal space of the hollow plastic core 11 may be filled with particles, such as sand. Alternatively, a pressurized gas may be supplied into the internal space of the hollow plastic core 11 so as to balance the external force applied to the hollow plastic core 11 during the compression step to thereby prevent the hollow plastic core 11 from being deformed. In addition, if there is a possibility that the hollow plastic core 11 may come into contact with the surface of the first mold groove 15a during the above-described compression step, the spacer members 13 may also be provided at the lower half of the outer peripheral surface of the hollow plastic core 11.

Figure 5:
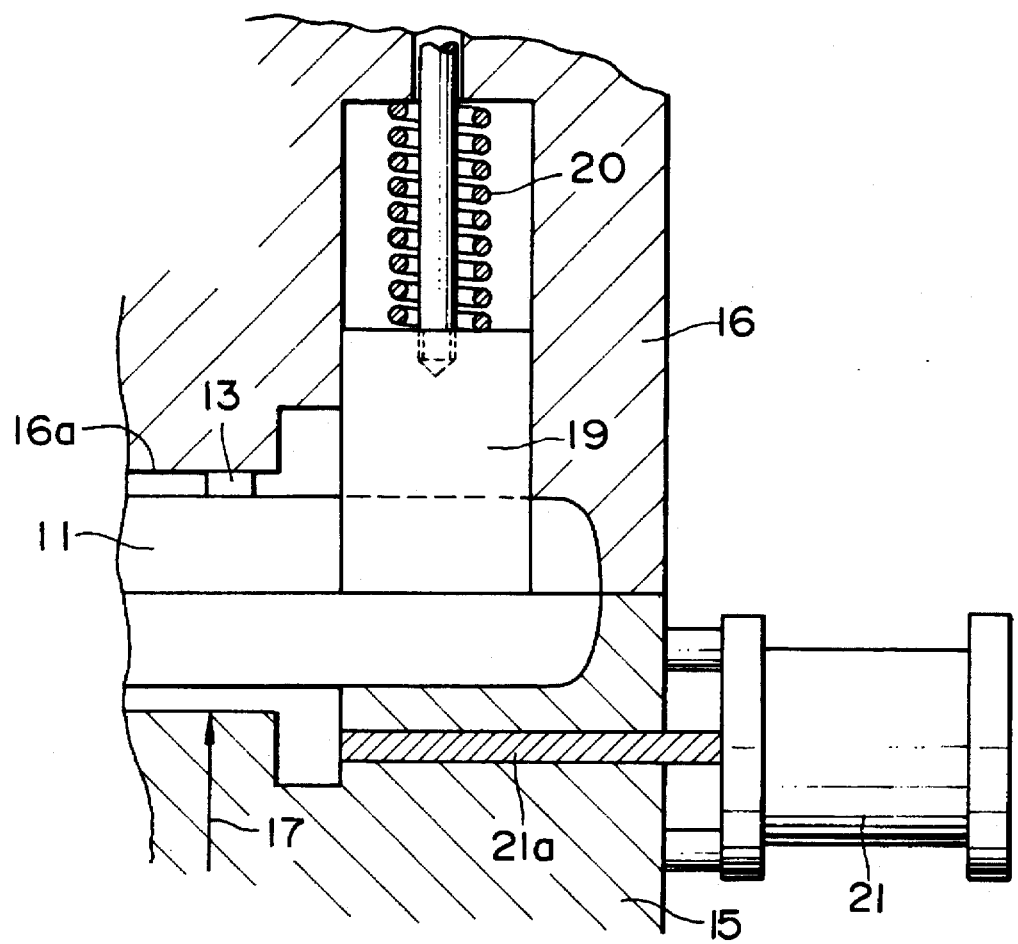
FIGS. 5 and 6 are schematic illustrations showing a modification to the process shown in FIGS. 4a through 4c.
Figure 6:
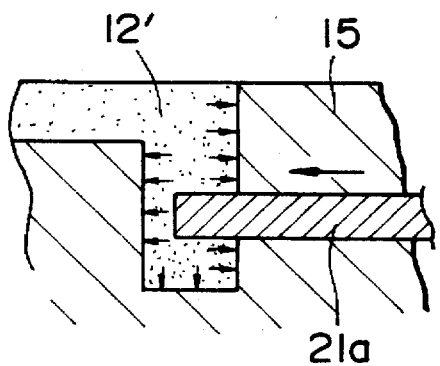

FIG. 5 illustrates a modification to the process for forming a multi-layered plastic pipe having a flange as shown in FIGS. 4a through 4c. That is, as shown in FIG. 5, a cylinder device 21 is mounted on the first mold half 15, and a rod 21a of the cylinder device 21 passes through a hole provided in the first mold half 15 so that the rod 21a may move into the cavity or retract from the cavity. In particular, the rod 21a may move into the space of a flange forming portion of the first mold groove 15a. Thus, when the first and second mold halves 15 and 16 are brought into a complete mating relationship to compress the third plastic material inside the cavity to thereby cause the third plastic material to be supplied to every section of the cavity uniformly, there is still a chance that the third plastic material fails to be properly supplied to the space of a flange forming portion of the cavity or properly compressed. Under the circumstances, during the compression step shown in FIG. 4a, by causing the rod 21a to move into the space of a flange forming portion of the first mold groove 15a, an additional compression force may be applied locally to that portion 12' of the third plastic material present in the space of a flange forming portion of the first mold groove 15a. In this case, a bore or hole is formed in the cylinder portion of the resulting product due to the rod 21a, and such a bore or hole may be later defined as a through-hole to be used as a mounting hole 12b of the flange portion 12a.

Figure 7A:
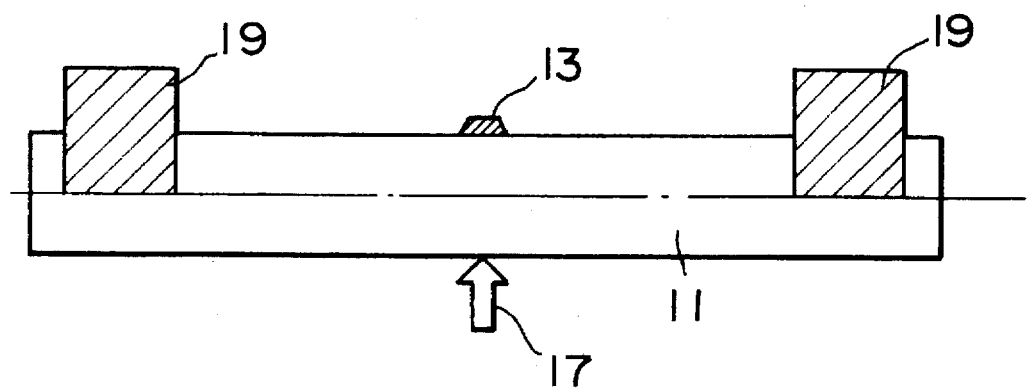
FIGS. 7a and 7b are schematic illustrations showing the principle in positioning a spacer member in practicing the present invention.

Next, referring to FIGS. 7a and 7b, the principle of determining the location where the spacer member 13 is to be disposed on the hollow plastic core 11 based on the present invention will be described. In the case of FIG. 7a, the hollow plastic core 11 is set in position by a pair of sliding cores 19 and a molten plastic material is supplied into the cavity from a supply port 17 from below. In this case, since the central portion of the hollow plastic core 11 tends to be lifted upward due to the incoming molten plastic material under pressure, a spacer member 13 must be provided on the hollow plastic core 11 somewhere at an upper half of the outer peripheral surface thereof. In FIG. 7a, although a single spacer member 13 is shown to be provided at a location diametrically opposite to the supply port 17, it is not always necessary to provide such a single spacer member 13 at a location opposite to the supply port 17 as shown, a desired number of such spacer members 13 may be provided on the hollow plastic core 11 so as to prevent the hollow plastic core 11 from coming into contact with the surface of the cavity.

Figure 7B:
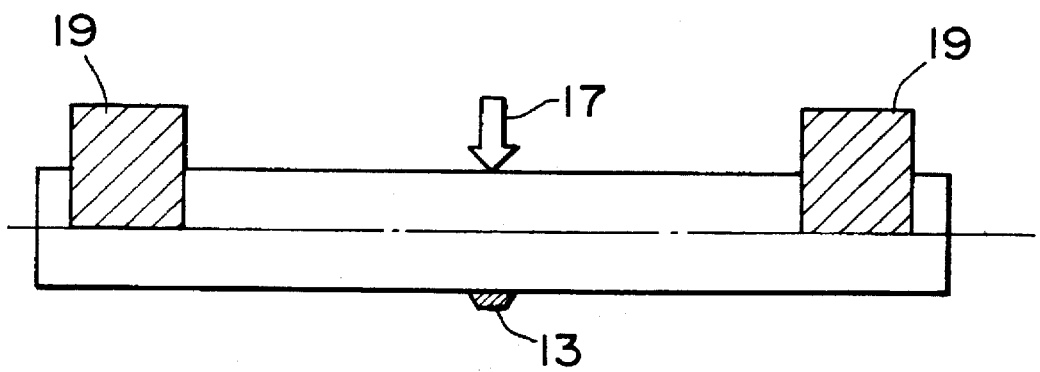

In FIG. 7b, a hollow plastic core 11 is set in position by means of a pair of sliding cores 19 and a molten plastic material is supplied into the cavity from a supply port 17 from above. In this case, since the hollow plastic core 11 tends to be pushed downward at its central portion when the molten plastic material is supplied into the cavity under pressure from the supply port 17, a single spacer member 13 is provided on the hollow plastic core 11 at its bottom diametrically opposite to the supply port 17 so as to prevent the hollow plastic core 11 from coming into contact with the surface of the cavity. Thus, fundamentally, it is only necessary to provide one or more spacer members 13 on that portion of the outer peripheral surface of the hollow plastic core 11 opposite to that side where a molten plastic material is supplied under pressure. However, it should also be noted that any desired number of such spacer members 13, same or different in shape and size, may only need to be provided on any portion of the hollow plastic core 11 so as to form the outer layer 12 of desired thickness depending on the shape of the hollow plastic core 11 and the method of supplying a molten plastic material into the cavity.

Figure 8A:
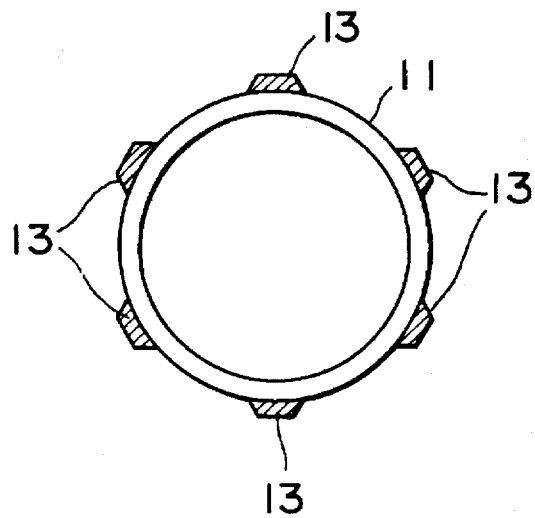
FIGS. 8a through 8d are schematic illustrations showing various embodiments of the spacer member.
Figure 8B:
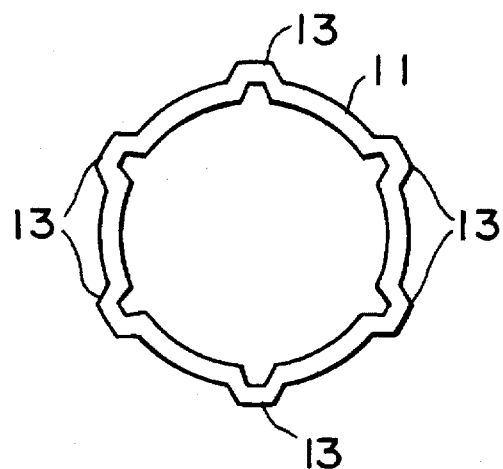
Figure 8C:
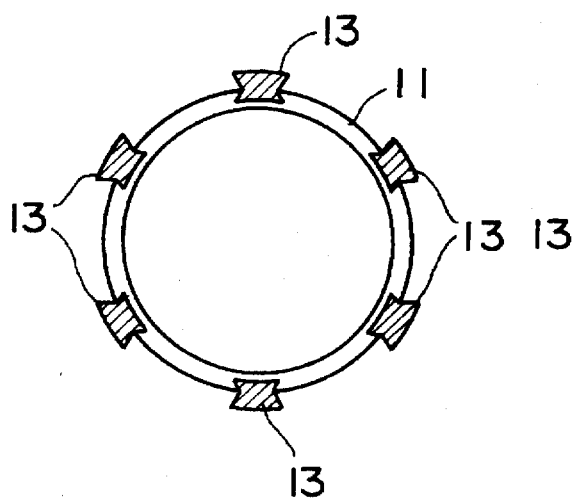
Figure 8D:
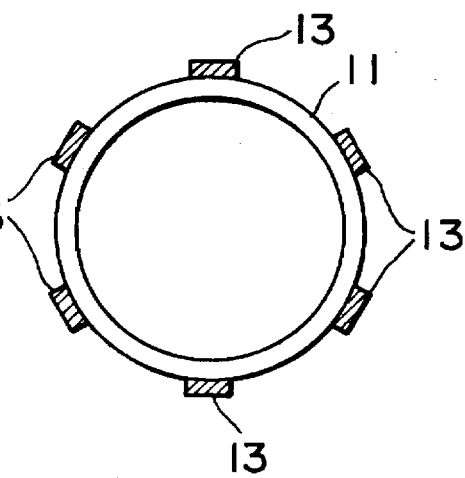

For example, as shown in FIG. 8a, a plurality of spacer members 13 may be provided circumferentially around the hollow plastic core 11. In particular, in the case where the hollow plastic core 11 has a complicated shape and a molten plastic material is to be supplied into the cavity through a plurality of supply ports, it is preferable to provide a plurality of such spacer members 13 in the circumferential direction of the hollow plastic core 11. Even when a plurality of spacer members 13 are to be provided in the circumferential direction of the hollow plastic core 11, they do not need to be provided on the same circumference at all times, and, instead, such spacer members 13 may also be provided circumferentially as shifted in the longitudinal direction of the hollow plastic core 11 one from another. FIG. 8b illustrates the case in which a plurality of spacer members 13 are defined by locally bending portions of the hollow plastic core 11 in the form of radially projecting ridges. Such a profiled hollow plastic core 11 may be easily formed by using a mold whose cavity surface is provided with a plurality of grooves. FIG. 8c illustrates a hollow plastic core 11 having a plurality of spacer members 13 partially buried therein, which can be manufactured by arranging a plurality of spacer members 13 in the cavity surface as inserts when blow molding the hollow plastic core 11. FIG. 8d illustrates the case in which, after forming a hollow plastic core 11 by blow molding, a plurality of spacer members 13 which have been fabricated separately are fixedly attached to the hollow plastic core 11 by using an adhesive agent or by melting them together.

Figure 9A:
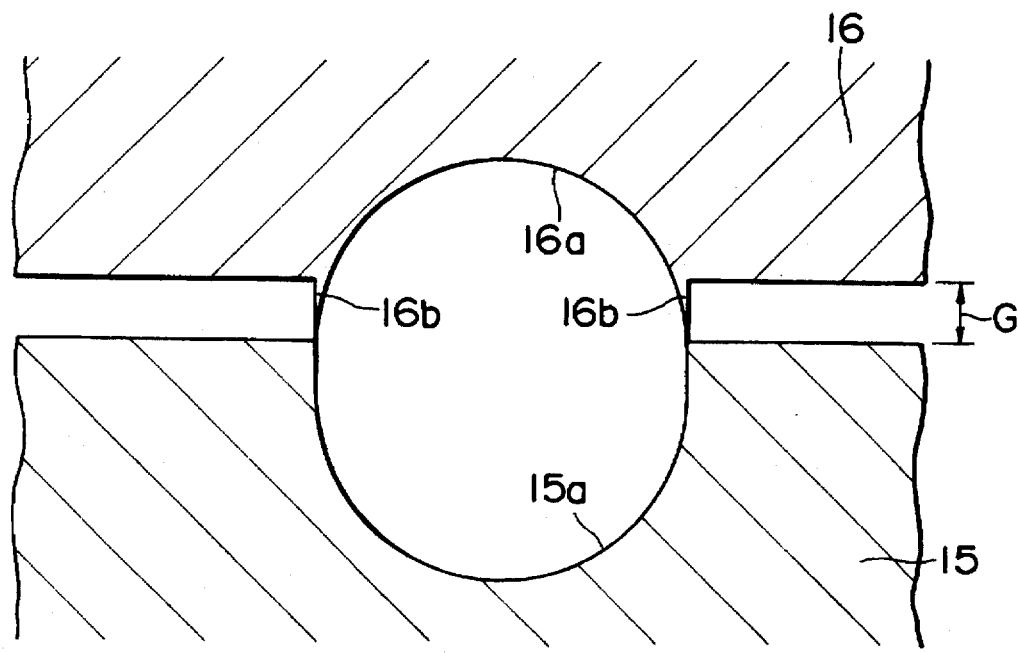
FIGS. 9a, 9b, 10a and 10b are schematic illustrations showing alternative structures of molds which can be advantageously used for practicing the present invention.

Next, with reference to FIGS. 9a, 9b, 10a and 10b, the structure of a mold suitable for use in a process of the present invention will be described in detail below. As shown in FIG. 9a, the first mold half 15 has a first mold groove 15a, and on the other hand the second mold half 16 has a second mold groove 16a. When the first and second mole halves 15 and 16 are brought closer together with a gap or clearance G defined between the respective mating surfaces, a semi-mating condition is defined and a cavity is defined between the first and second mold grooves 15a and 15b. A pair of projections 16b is formed on the opposite sides of the second mold groove 16a, and these projections 16b have a height larger than the clearance G. On the other hand, the opposite sides in the first mold groove 15a are so structured to be able to receive these projections 16b, respectively. Thus, in the condition shown in FIG. 9a, the tip ends of these projections 16b are partially fitted into the respective receiving sections of the first mold groove 15a so that the cavity is set in its partially closed state or semi-mating condition. Under this semi-mating condition, air may pass through a clearance between the projection 16b and its associated receiving section of the first mold groove 15a, but no molten plastic material is allowed to pass therethrough.

Figure 9B:
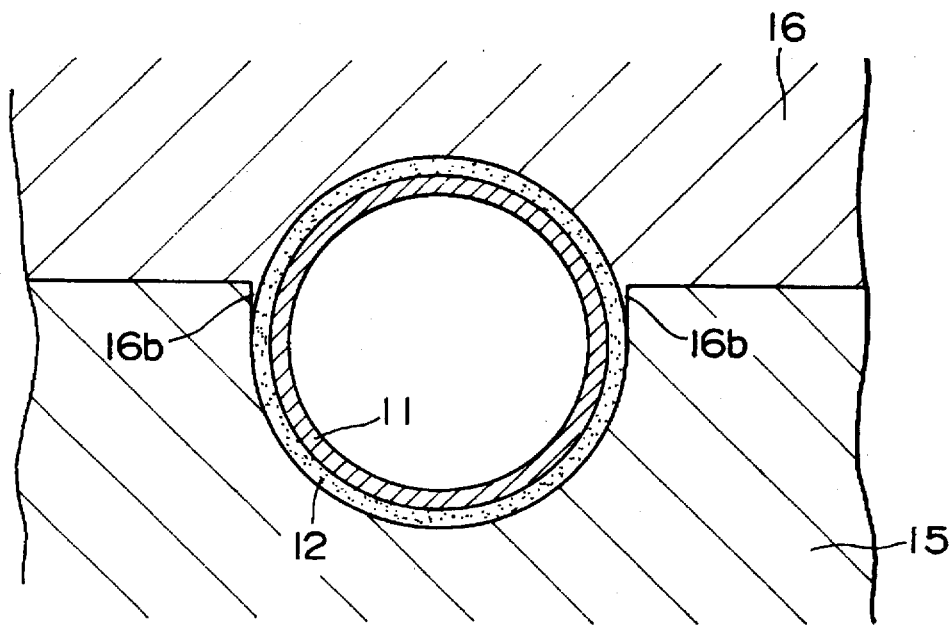

Accordingly, when a molten plastic material is supplied into the cavity under pressure under this semi-mating condition, the air inside the cavity is allowed to be discharged out into the atmosphere through the clearance between the projection 16b and the associated receiving section of the first mold groove 15a, whereas the molten plastic material thus supplied into the cavity is substantially prevented from flowing out of the cavity through such clearance. FIG. 9b illustrates the condition in which, after supplying a molten plastic material into the cavity, the first and second mold halves 15 and 16 are brought into a complete contact to thereby establish a complete mating condition, and, thus, FIG. 9b corresponds to FIG. 4c.

Figure 10A:
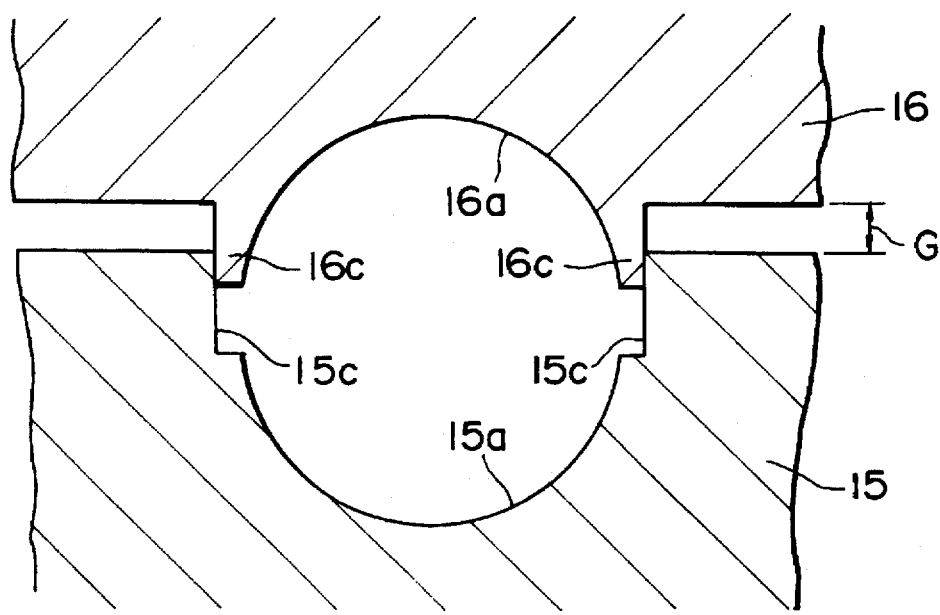
Figure 10B:
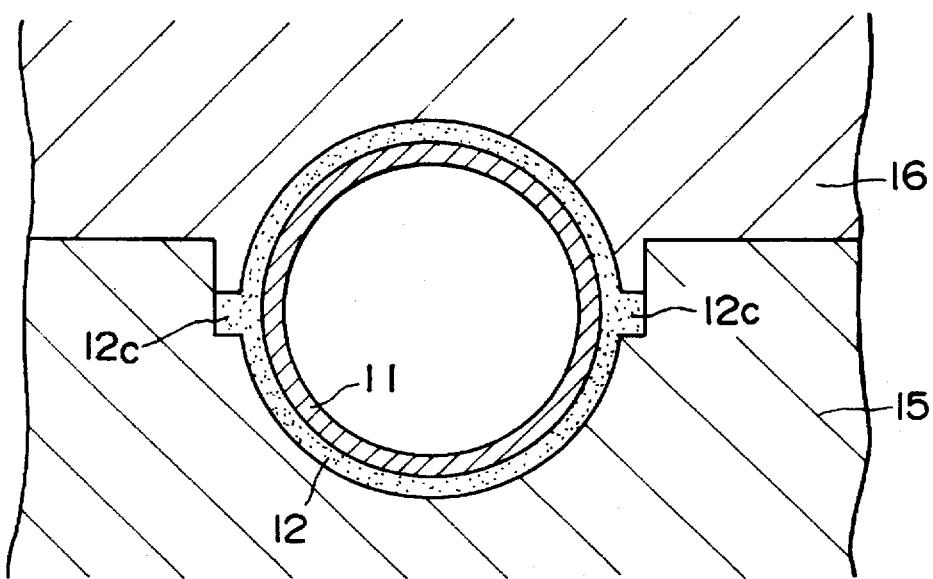

FIG. 10a illustrates the structure of another mold for use in another embodiment of the present invention. In the embodiment shown in FIG. 10a, the first mold half 15 has a first mold groove 15a which is formed with a cut-away section 15c at each side thereof, and the second mold half 16 has a second mold groove 16a which is formed with a pair of projections 16c on the opposite sides thereof. In this case, as different from the embodiment shown in FIG. 9b, these projections 16c have their sharp tip ends cut away to provide blunt ends. Accordingly, the projections 16c of the present embodiment are improved in rigidity, and the shape of these projections 16c are least affected or modified by repeated use. As a result, even if a large number of multi-layered plastic pipes are to be manufactured, an intended and same characteristic may be maintained. Moreover, in the present embodiment, as shown in FIG. 10b, even if the first and second mold halves 15 and 16 are set in the complete mating condition, since the projections 16c do not occupy the entire space defined by the cut-away sections 15c, the resulting multi-layered plastic pipe will have a rib 12c formed extending longitudinally as a part of the outer layer 12. Such a rib 12c is preferred in some cases since it would provide an increased strength and rigidity to the outer layer 12.

Figure 11A:
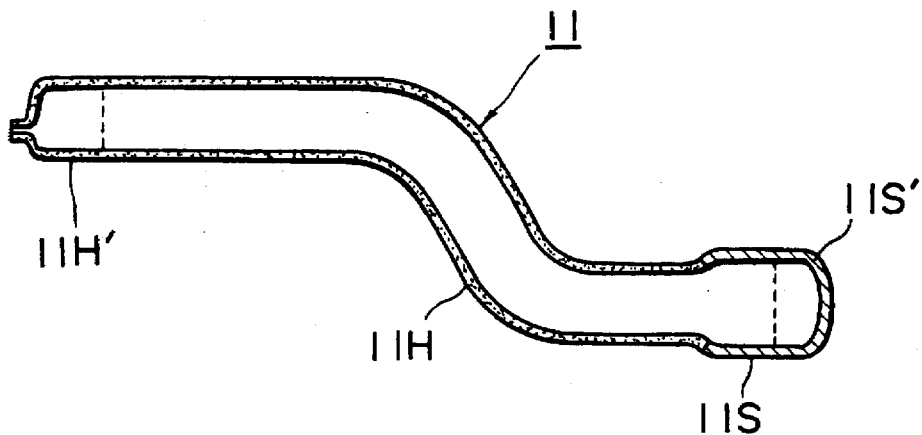
Figure 11B:
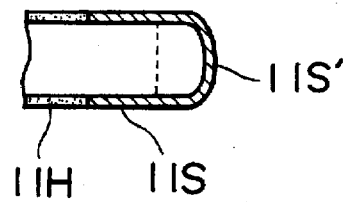

Next, various modifications and alternate embodiments of the present invention will now be described below. FIGS. 11a through 11f illustrate a process for manufacturing a multi-layered plastic pipe having a flexible or relatively soft fitting section at one end. As shown in FIG. 11a, in the first place, a hollow plastic core 11 is fabricated by a blow molding technique. This hollow plastic core 11 includes a hard section 11H comprised of a relatively hard plastic material and a soft section 11S comprised of a relatively soft plastic material. As the relatively hard plastic material, use may, for example, be made of nylon 6, whereas, as the relatively soft plastic material, use may, for example, be made of nylon 11. In the case of blow molding a hollow plastic core 11 having a unitary structure from the two plastic materials different in hardness, the plastic material supplied to a nozzle to form a parison is switched from one material to another to thereby form a composite parison having two different plastic materials along different portions of its longitudinal axis and then the resulting composite parison may be subjected to blow molding to define a desired shape.

As best shown in FIG. 11a, the hollow plastic pipe 11 thus formed has unnecessary portions 11H' and 11S' at respective ends, and these unnecessary end portions 11H' and 11S' will be later removed. In the embodiment shown in FIG. 11a, the soft section 11S is enlarged in diameter. On the other hand, in an embodiment shown in FIG. 11b, both of the hard and soft sections 11H and 11S have the same diameter.

Figure 11C:
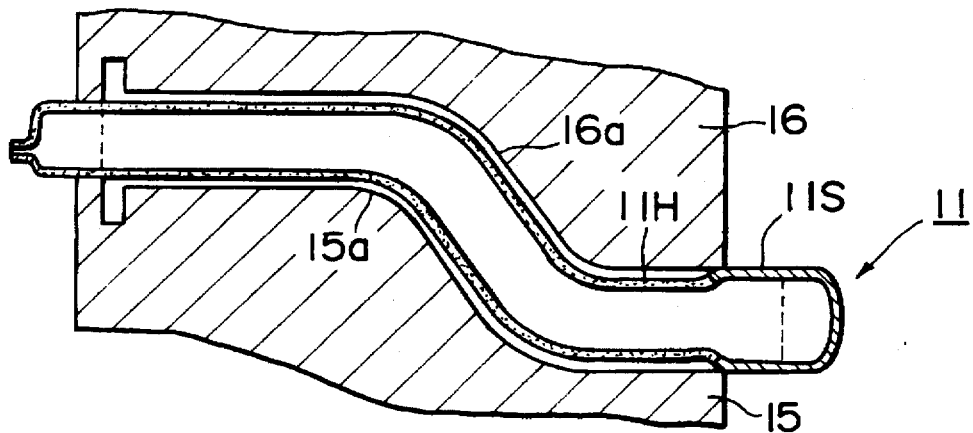

As shown in FIG. 11c, the hollow plastic core 11 thus formed is then set in position in a cavity defined between first and second mold halves 15 and 16. Then, as shown in FIG. 11d, a molten plastic material is supplied under pressure into the cavity through supply passages 17 provided in the first mold half 15. The molten plastic material supplied in this case is normally a relatively hard plastic material, such as a mixture of nylon 6 and glass fibers (30%). Then, the first and second mold halves 15 and 16 are brought into complete contact to thereby establish a complete mating condition and apply a compression force to the plastic material, so that an outer layer 12 is integrally formed on the outer surface of the hollow plastic core 11. In this case, preferably, a pressurized gas is injected into the interior of the hollow plastic core 11 or alternatively particles, such as sand, may be filled in the interior of the hollow plastic core 11 in advance. In addition, preferably, a desired number of spacer members may be provided on the outer peripheral surface of the hollow plastic core 11 as described before.

Then, upon hardening of the molten plastic material, the first and second mold halves are separated from each other and the resulting product molded under pressure is removed from the mold. The resulting product is shown in FIG. 11e. Then the undesired portions 11H' and 11S' are removed from the product so that a desired multi-layered plastic pipe can be obtained as shown in FIG. 11f. FIG. 11g illustrates an embodiment where both of the hard and soft sections 11H and 11S have the same diameter. The resulting multi-layered plastic pipe has a flange portion 12a formed from a relatively hard plastic material at one end and a fitting portion 11S formed from a relatively soft plastic material at the opposite end. The fitting portion 11S is relatively soft and thus it may be fitted into or onto another pipe.

Figure 12A:
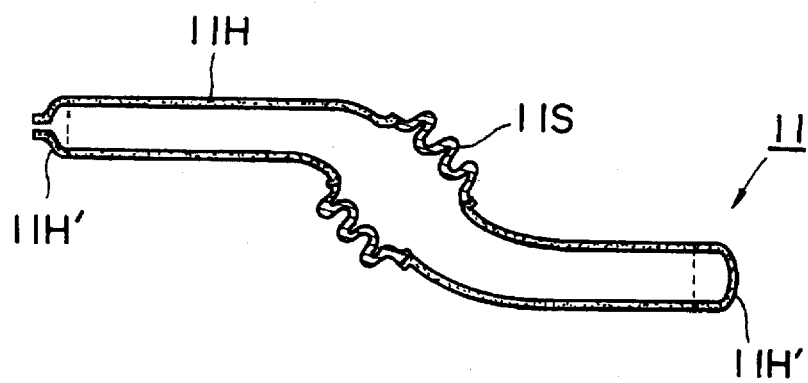
FIGS. 12a through 12c are schematic illustrations showing a sequence of steps in manufacturing a multi-layered plastic pipe having a bellowed portion in accordance with a further embodiment of the present invention.
Figure 12B:
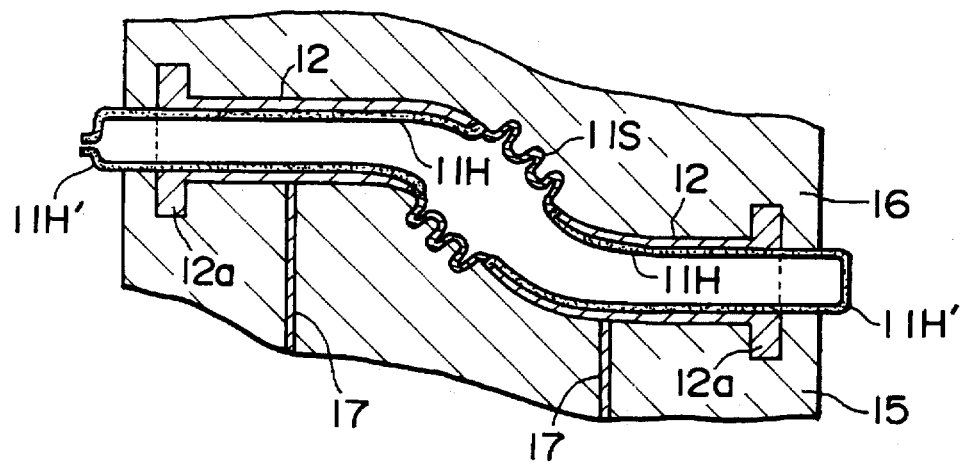
Figure 12C:
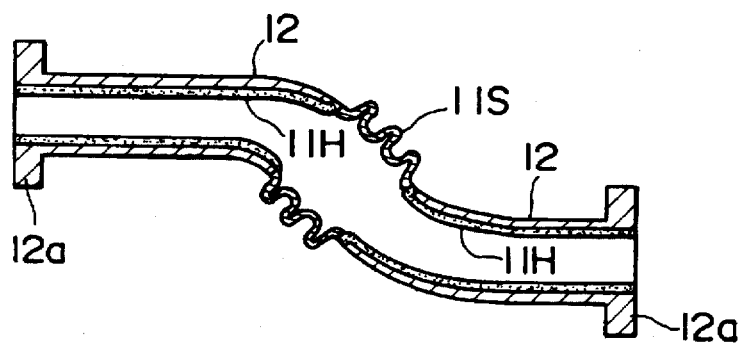

Now, referring to FIGS. 12a through 12c, a process for manufacturing a multi-layered plastic pipe having a bellowed section in accordance with a further embodiment of the present invention will be described. In the first place, as shown in FIG. 12a, a hollow plastic core 11 is fabricated by a blow molding technique. In this case, the hollow plastic core 11 includes a hard section 11H comprised of a relatively hard plastic material, such as nylon 6-6, and a bellows section 11S comprised of a relatively soft plastic material, such as nylon 12. In addition, it also include an undesired portion 11H', which will be removed later, at each end thereof. Then, the hollow plastic core 11 shown in FIG. 12a is set in position in a cavity defined between the first and second mold halves 15 and 16, and a molten plastic material is supplied under pressure into the cavity through supply passages 17. For such a molten plastic material, use may be made, for example, of a mixture of nylon 6-6 and glass fibers (for example, 30%). In this case, the molten plastic material is supplied onto the outer peripheral surface of the hard section 11H excepting the bellows section 11S. Then, mold halves 15 and 16 are brought into complete contact to thereby establish a complete mating condition and the molten plastic material thus supplied is hardened to form an outer layer 12 having a desired shape. In the present embodiment, the outer layer 12 will have a flange portion 12a at each end thereof. Preferably, during this compression step, a pressurized gas may be injected into the interior of the hollow plastic core 11 or alternatively particles such as sand particles may be filled in the interior of the hollow plastic core 11 in advance to prevent deformation from occurring on the hollow plastic core 11 due to an external force applied thereto. In addition, as described before, one or more of spacer members may be provided at selected locations on the outer peripheral surface of the hard section 11H of the hollow plastic core 11.

Upon completion of molding, the mold halves 15 and 16 are separated to remove the resulting plastic product and its undesired end portions 11H' are cut away. The resulting multi-layered plastic pipe is illustrated in FIG. 12c.

Figure 13A:
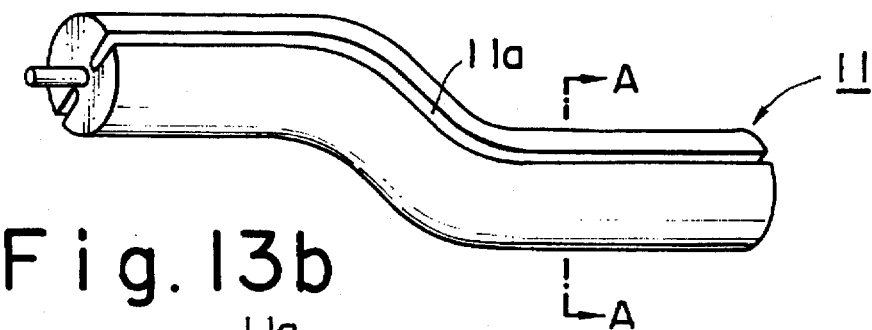
FIGS. 13a through 13d are schematic illustrations showing a sequence of steps in manufacturing a multi-layered plastic pipe including a pair of independent flow passages in accordance with a still further embodiment of the present invention.
Figure 13B:
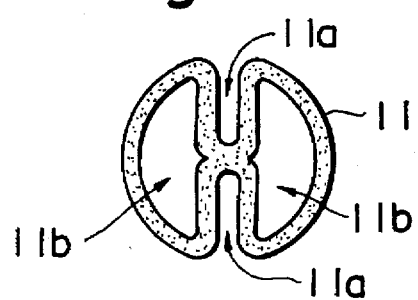
Figure 13C:
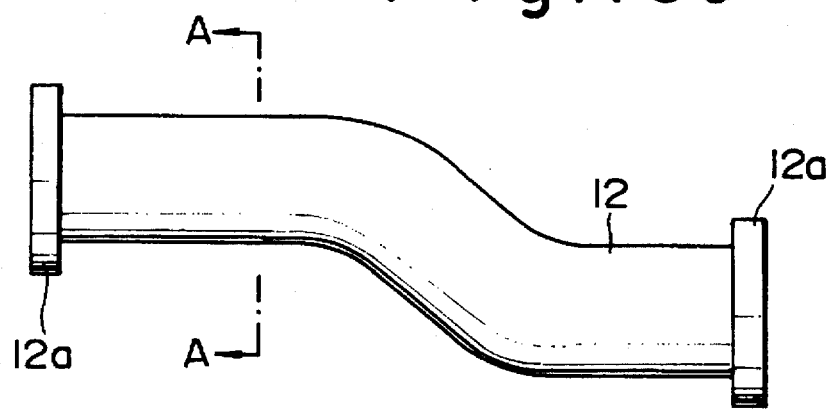
Figure 13D:
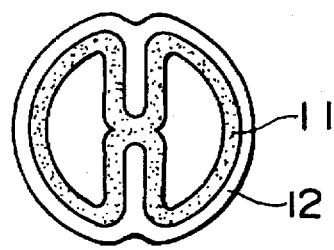

Referring now to FIGS. 13a through 13d, a process for manufacturing a multi-layered plastic pipe having a plurality of independent flow passages will be described in detail below. FIG. 13a illustrates a hollow plastic core 11 fabricated into a desired shape by blow molding. This hollow plastic core 11, as shown in transverse cross section in FIG. 13b, is formed with a pair of upper and lower grooves 11a whose bottoms are in contact to thereby define a pair of independent flow passages 11b. Such a hollow plastic core 11 is set in position in a cavity defined between a pair of first and second mold halves in a manner described with respect to the before-mentioned embodiments, and then a molten plastic material is supplied into the cavity, followed by the steps of bringing the two mold halves in complete contact to carry out forming under pressure. Upon completion of forming, the two mold halves are separated away from each other to remove the resulting product therefrom. And then the undesired end portions are cut away. As a result, there can be obtained a multi-layered plastic pipe having a plurality of independent flow passages as shown in FIG. 13c. This multi-layered plastic pipe is formed with a flange portion 12a at each end thereof, and its cross sectional structure is illustrated in FIG. 13d.

Figure 14A:
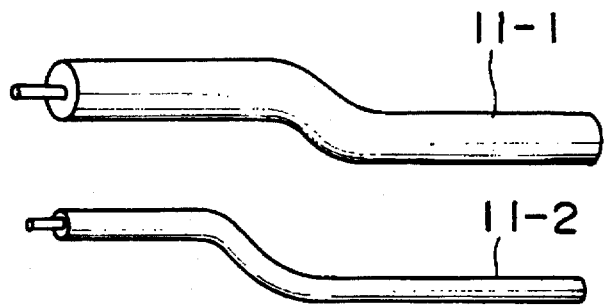
FIGS. 14a through 14c are schematic illustrations showing a sequence of steps in manufacturing a multi-layered plastic pipe including a pair of independent flow passages in accordance with a still further embodiment of the present invention.
Figure 14B:
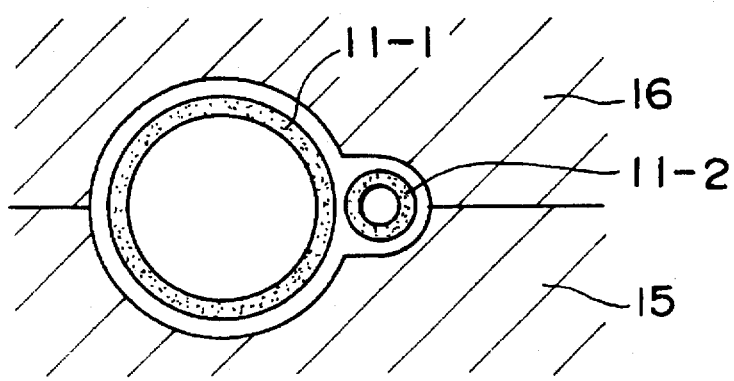
Figure 14C:
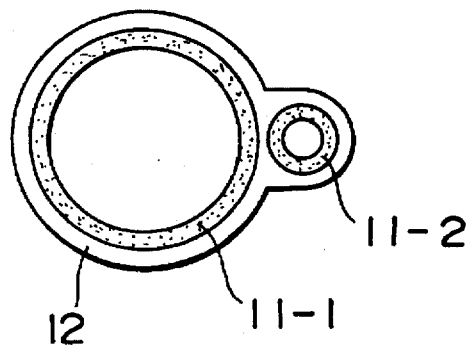

With reference to FIGS. 14a through 14c, a process for manufacturing a multi-layered plastic pipe having a plurality of flow passages in accordance with another embodiment of the present invention will now be described. As shown in FIG. 14a, in the first place, a plurality (two in the illustrated embodiment) of hollow plastic cores 11-1 and 11-2, each having its own desired shape, are molded by blow molding. Then, as shown in FIG. 14b, these two hollow plastic cores 11-1 and 11-2 are set in position in a cavity defined between a pair of first and second mold halves 15 and 16. Then, a molten plastic material is supplied under pressure into the cavity and the two mold halves are brought into complete contact to thereby have the molten plastic material formed into a desired shape under compression. Upon completion of forming, the mold halves are separated away from each other to remove the resulting product and then the undesired end portions are cut away to provide a multi-layered plastic pipe having a plurality of independent flow passages. The cross sectional structure of the resulting multi-layered plastic pipe is illustrated in FIG. 14c.

Figure 15A:
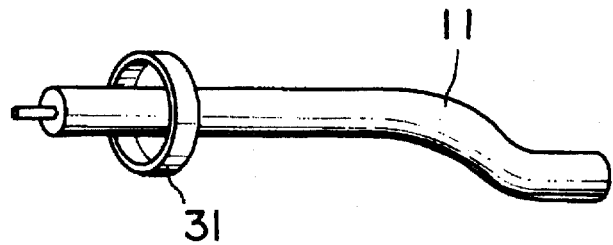
FIGS. 15a through 15f are schematic illustrations showing a sequence of steps in manufacturing a multi-layered plastic pipe including a flange portion reinforced by a metal member in accordance with a still further embodiment of the present invention.
Figure 15B:
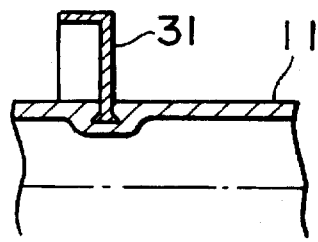
Figure 15C:
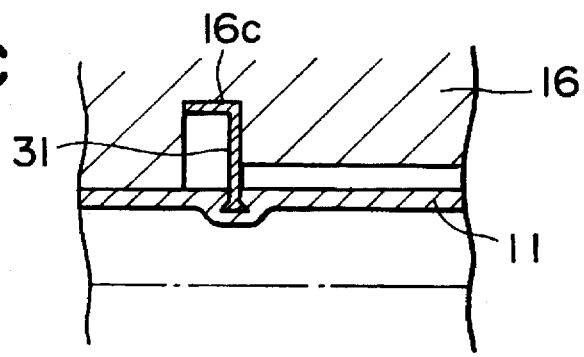

Now, with reference to FIGS. 15a through 15f, a process for manufacturing a multi-layered plastic pipe having a flange portion covered with a metal member in accordance with a still further embodiment of the present invention will be described. In the first place, as shown in FIG. 15a, a hollow plastic core 11 is molded by a blow molding technique using a cap-shaped metal member 31 as an insert component. FIG. 15b illustrates the condition in which the cup-shaped metal member 31 is integrally formed with the hollow plastic core 11 by blow molding. Then, as shown in FIG. 15c, this hollow plastic core 11 is set in position in a mold cavity. In this case, use may be made of a pair of first and second mold halves 15 and 16 as described before, in which case, however, the first and second mold halves 15 and 16 are formed with enlarged portions 16c of the mold grooves for receiving therein a part of the metal member 31, respectively. Therefore, in this case, the metal member 31 serves as a stopper for the first and second mold halves 15 and 16, and the hollow plastic core 11 may be set in position in the cavity when the metal member 31 is properly inserted into the enlarged portions 16c of the mold grooves.

Figure 15D:
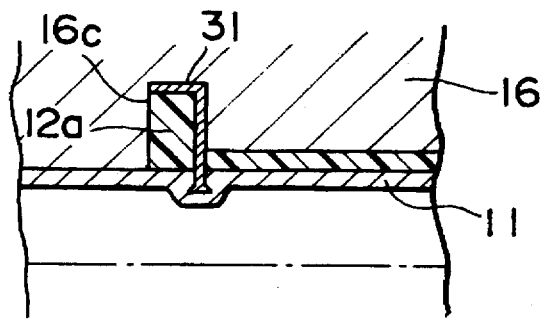

Then, as shown in FIG. 15d, a molten plastic material is supplied under pressure into the cavity through at least one supply passage 17 (not shown) provided in either of or both of the first and second mold halves 15 and 16. Then, the two mold halves 15 and 16 are brought into complete mating condition to carry out compression forming so that an outer layer 12 having a desired shape is integrally formed from the molten plastic material. In this case, however, it is preferable to supply a pressurized gas into the interior of the hollow plastic core 11, or, alternatively, particles, such as sand, may be filled in the interior of the hollow plastic core 11 in advance so as to prevent the hollow plastic core 11 from being deformed during compression forming. Furthermore, preferably, a desired number of spacer members may be provided at desired locations on the outer peripheral surface of the hollow plastic core 11. Upon completion of forming, the mold halves are separated away from each other and the resulting product is removed from the mold. The resulting structure is shown in cross section in FIG. 15e.

Figure 15E:
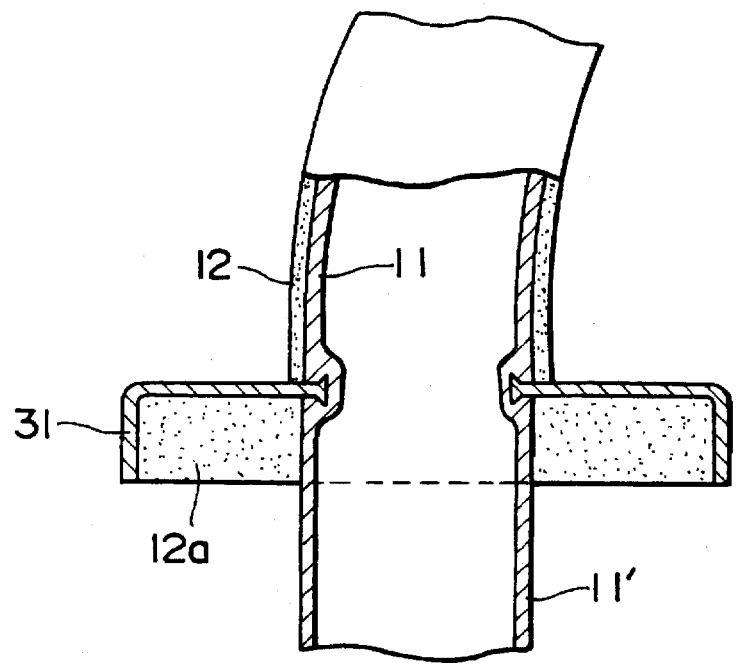
Figure 15F:
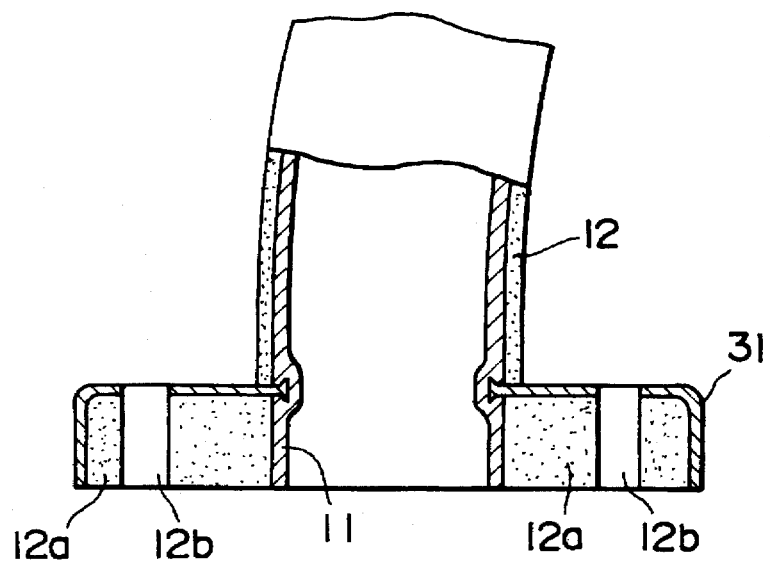

Then, the undesired portion 11' of the hollow plastic core 11 shown in FIG. 15e is cut away, and, as shown in FIG. 15f, one or more of mounting holes 12b are formed passing through the flange portion 12a and the cup-shaped metal member 31. In a multi-layered plastic pipe thus manufactured, since the flange portion 12a is covered with and thus reinforced by the metal member 31, when the flange portion 12a is mounted, for example, on an object, such as an internal combustion engine, by bolts and nuts, the flange portion 12a is prevented from being deformed due to bolt tightening, thereby allowing to provide a secure mounting structure.

Figure 16A:
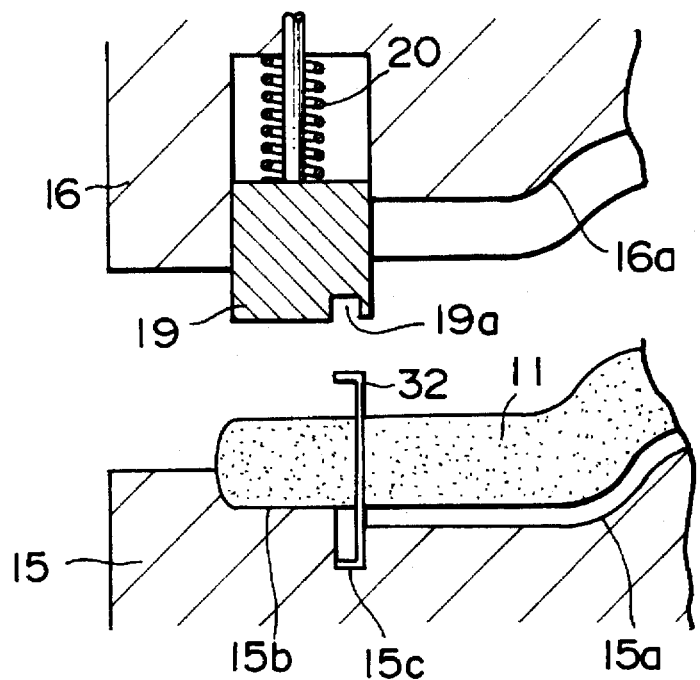
FIGS. 16a and 16b are schematic illustrations showing a modification to the process for manufacturing a multi-layered plastic pipe including a flange portion reinforced by a metal member.
Figure 16B:
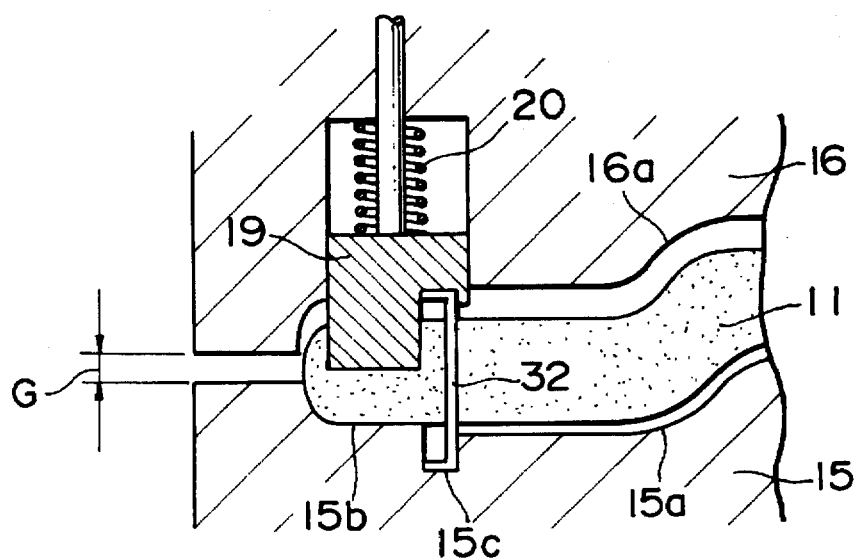

FIGS. 16a and 16b illustrate another process for manufacturing a multi-layered plastic pipe whose flange portion is reinforced by a metal member in accordance with a still further embodiment of the present invention. As shown in FIGS. 15a and 15b, in the first place, a hollow plastic core 11 having a metal member 31 is formed by blow molding, and the resulting hollow plastic core 11 is set in position in a mold groove of the first mold half 15. In this case, the first mold half 15 is formed with a mold groove 15a having a predetermined shape, with an enlarged portion 15c for partly receiving therein the metal member 32 and with a seat 15b for holding thereon an end portion of the hollow plastic core 11. On the other hand, the second mold half 16 is formed with a second mold groove 16a having a predetermined shape and provided with a sliding core 19, which may move between its advanced position and retracted position and is normally biased toward its advanced position by means of a spring 20. The sliding core 19 is formed with a cut-away portion 19a for receiving therein a part of the metal member 32.

With the above-described structure, when the second mold half 16 is lowered, the metal member 32 is placed into the cut-away portion 19a of the sliding core 19, and the second mold half 16 is further moved downward until the distance between the opposing mating surfaces of the first and second mold halves 15 and 16 becomes a predetermined gap G, wherein a semi-mating condition is set. This condition is illustrated in FIG. 16b. Under the condition, a molten plastic material is supplied into the cavity through supply passages 17 (not shown) provided in either one or both of the first and second mold halves 15 and 16. Thereafter, the first and second mold halves 15 and 16 are brought into a complete mating condition by reducing the gap G zero to thereby carry out compression forming so that the molten plastic material is formed into a desired shape around the hollow plastic core 11. Upon hardening of the molten plastic material, the mold halves 15 and 16 are separated away from each other and the resulting product is removed. Then, similarly as described before, an undesired portion is removed from the resulting product to provide a multi-layered plastic pipe.

Also in the present embodiment, as described in each of the above-described embodiments, prior to the step of compression forming, a pressurized gas may be injected into the interior of the hollow plastic core 11, or, alternatively, particles, such as sand, may be filled in the interior of the hollow plastic core 11 so as to prevent the hollow plastic core 11 from being deformed when an external force is applied to the peripheral surface thereof. In addition, preferably, a desired number of spacer members may be provided at one or more selected portions on the outer peripheral surface of the hollow plastic core 11.

As described above, in accordance with the present invention, there can be provided a multi-layered plastic pipe excellent in heat-resistant characteristic and durability. In particular, in accordance with the present invention, it is possible to provide a multi-layered plastic pipe having a uniform characteristic along the entire length of the plastic pipe by using a desired number of spacer members. Thus, a multi-layered plastic pipe of the present invention can have a characteristic extremely close to design conditions and thus high in reliability. Moreover, the present invention also provides a method or process for manufacturing a multi-layered plastic pipe high in reproducibility. Thus, there is provided a process capable for manufacturing various automobile components, such as intake manifolds and radiator hoses, which are exposed to high temperature and vigorous vibrations, from plastic materials. In particular, when applied as ducts to be used in automobiles, the components can be reduced in weight significantly, and, for example, a reduction in weight as much as 50% can be attained when the present invention is used as compared with the case of a prior art intake manifolds made of die-casted aluminum.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A multi-layered plastic pipe, comprising:

a blow molded hollow member formed in a predetermined shape from a first plastic material;

a plurality of isolated spacer members each provided in the form of an isolated projection, having side peripheries, the projections being at multiple predetermined selected places spaced longitudinally on an outer peripheral surface of said blow molded hollow member, said spacer members having a predetermined height and being formed from a second plastic material;

an outer layer integrally formed from a third plastic material on said outer peripheral surface of said blow molded hollow member and surrounding the entire side peripheries of said spacer members; and wherein said spacer members are located at the multiple predetermined selected places to define a means for counteracting a force applied to said blow molded hollow member in a direction transverse to a longitudinal axis of said blow molded hollow member when the third plastic material is formed on said blow molded hollow member.

2. The plastic pipe of claim 1, wherein third plastic material is a mixture of said first plastic material and a reinforcing material.

3. The pipe of claim 1, wherein said first and second plastic materials are substantially same in composition.

4. The pipe of claim 3, wherein each of said first and second plastic materials includes a material selected from the group consisting of nylon 6, nylon 6 containing glass fibers, nylon 6-6, nylon 6-6 containing glass fibers, nylon 11, nylon 12, nylon 4-6, nylon 6-10, nylon 6-12, nylon family alloys, polyphenylene sulfide, polyethylene terephthalate, polybutylene terephthalate, polyether sulfone, polyetheretherketone, polyimide and polyamideimide.

5. The pipe of claim 1, wherein said pipe is an intake manifold of an automobile component and said pipe is made of a plastic material having an anti-gasoline characteristic.

6. The plastic pipe of claim 1, wherein the projections are in the form of columns extending from the outer peripheral surface of said blow molded hollow member.

7. The plastic pipe of claim 1 wherein said projections are provided only at said multiple predetermined selected places.

8. The plastic pipe of claim 7 wherein said projections are integrally formed with and are of the same plastic material as said blow molded hollow member.

9. The plastic pipe of claim 1 wherein a first portion of the outer peripheral surface of said blow molded hollow member is free of said projections, said first portion being substantially larger than a second portion of the outer peripheral surface of said blow molded hollow member occupied by said projections.

10. The plastic pipe of claim 1 wherein said first plastic material, said second plastic material and said third plastic material are the same plastic material.

11. The plastic pipe of claim 10 wherein said third plastic material is a fiber or filler reinforced material.

12. The plastic pipe of claim 1 wherein said spacer members comprise radially projecting ridges extending from said outer peripheral surface of said blow molded hollow member.

13. The plastic pipe of claim 1 wherein said spacer members are further spaced circumferentially around the blow molded hollow member at the predetermined selected places.

14. A multi-layered plastic pipe, comprising:

a blow molded hollow member formed in a predetermined shape from a first plastic material;

a plurality of isolated spacer members each integrally formed on the blow molded hollow member and provided in the form of an isolated projection, having side peripheries, the projections being at multiple predetermined selected places spaced longitudinally on an outer peripheral surface of said blow molded hollow member, said spacer members having a predetermined height and being formed from a second plastic material;

an outer layer integrally formed from a third plastic material on said outer peripheral surface of said blow molded hollow member and surrounding the entire side peripheries of said spacer members, said outer layer having end flanges and having a thickness between said end flanges substantially equal to the height of the spacer members; and wherein said spacer members are located at the multiple predetermined selected places on said blow molded hollow member to define a means for determining the thickness of the outer layer between said end flanges.

* * * * *